US012326249B2

(12) United States Patent
Loomis et al.

(10) Patent No.: US 12,326,249 B2
(45) **Date of Patent: *Jun. 10, 2025**

(54) WATER-RESISTANT WIRED ELECTRO-MAGNETIC COMPONENT CAPTURE

(71) Applicant: Foot-Candle, LLC, Toano, VA (US)

(72) Inventors: Jason Loomis, Decatur, GA (US); Nash Rittmann, Odessa, FL (US); Yi Xin Long, Jiangmen (CN)

(73) Assignee: FOOT-CANDLE, LLC, Toana, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/810,078

(22) Filed: Aug. 20, 2024

(65) Prior Publication Data

US 2024/0410562 A1 Dec. 12, 2024

Related U.S. Application Data

(63) Continuation of application No. 18/608,536, filed on Mar. 18, 2024, which is a continuation of application (Continued)

(51) Int. Cl.

*F21V 31/00* (2006.01)
*F21S 4/10* (2016.01)

(Continued)

(52) U.S. Cl.

CPC .............. *F21V 31/005* (2013.01); *F21S 4/10* (2016.01); *F21V 3/02* (2013.01); *F21Y 2115/10* (2016.08)

(58) Field of Classification Search

CPC ............. F21S 4/10; F21V 3/02; F21V 31/005
See application file for complete search history.

(56) References Cited

U.S. PATENT DOCUMENTS

| | | | |
|---|---|---|---|
| 632,552 | A | 9/1899 | Doolittle |
| 5,428,518 | A | 6/1995 | Huang |

(Continued)

FOREIGN PATENT DOCUMENTS

| | | | |
|---|---|---|---|
| CN | 2355212 | Y | 12/1999 |
| CN | 2375857 | Y | 4/2000 |
| FR | 3011910 | A1 | 4/2015 |

OTHER PUBLICATIONS

Counterclaim-Plaintiffs' First Amended Disclosure of Infringement Contentions, Case 1:24-cv-03049-MLB, filed Oct. 25, 2024 in the U.S. District Court, Northern District of Georgia, Atlanta Division, 12 pages.

(Continued)

*Primary Examiner* — Tsion Tumebo
(74) *Attorney, Agent, or Firm* — Thompson Patent Law Offices PC

(57) ABSTRACT

Apparatus and associated methods relate to a water-resistant capture device for enclosing wired electro-magnetic components, the capture device having a base module and a connecting cap module, wherein when the base module and cap module enclose an electro-magnetic component and the base module is connected to the cap module, one or more electric wires are compressed within deformable wire apertures formed by the combined base module and cap module. In some embodiments, the base module is deformable and deforms when affixed to the cap module so as to form a compressive water-resistant seal to an interior of the capture device. In an exemplary embodiment, an LED may be captured within the capture device. The cap module may provide a compressing aperture to provide a water resistant seal around the lens of a LED projecting therethrough.

24 Claims, 10 Drawing Sheets

Related U.S. Application Data

No. 18/312,420, filed on May 4, 2023, now Pat. No. 11,946,634, which is a continuation of application No. 17/933,041, filed on Sep. 16, 2022, now Pat. No. 11,976,813, which is a continuation-in-part of application No. 17/450,006, filed on Oct. 5, 2021, now Pat. No. 11,493,198, which is a continuation-in-part of application No. 17/301,850, filed on Apr. 15, 2021, now Pat. No. 11,454,385, which is a continuation of application No. 16/829,937, filed on Mar. 25, 2020, now Pat. No. 11,015,798, which is a continuation of application No. 16/659,302, filed on Oct. 21, 2019, now Pat. No. 11,009,225, which is a continuation of application No. 15/721,004, filed on Sep. 29, 2017, now Pat. No. 10,584,865, which is a continuation of application No. 14/602,526, filed on Jan. 22, 2015, now Pat. No. 9,803,851.

(60) Provisional application No. 61/931,360, filed on Jan. 24, 2014.

(51) Int. Cl.

*F21V 3/02* (2006.01)

*F21Y 115/10* (2016.01)

(56) References Cited

U.S. PATENT DOCUMENTS

| | | | | |
|---|---|---|---|---|
| 5,435,741 | A | 7/1995 | Wang | |
| 5,626,415 | A | 5/1997 | Huang | |
| 5,644,189 | A | 7/1997 | Busby | |
| 5,672,077 | A | 9/1997 | Wang et al. | |
| 5,685,638 | A | 11/1997 | Huang | |
| 5,820,416 | A | 10/1998 | Carmichael | |
| 6,022,241 | A | 2/2000 | Lin | |
| 6,120,312 | A | 9/2000 | Shu | |
| 6,123,433 | A | 9/2000 | Chen | |
| 6,183,310 | B1 | 2/2001 | Shu | |
| 6,250,782 | B1 | 6/2001 | Huang | |
| 6,357,902 | B1 | 3/2002 | Horowitz | |
| 6,416,203 | B1 | 7/2002 | Wong | |
| 6,502,962 | B1 | 1/2003 | Kenneth et al. | |
| 6,572,247 | B2 | 6/2003 | Liu | |
| 6,595,657 | B1 | 7/2003 | Shieh | |
| 6,719,441 | B2 | 4/2004 | Wong | |
| 6,796,688 | B2 | 9/2004 | Huang | |
| 6,921,180 | B2 | 7/2005 | Huang | |
| 7,222,987 | B2 | 5/2007 | Tseng | |
| 7,241,032 | B2 | 7/2007 | Qingbiao | |
| 7,575,362 | B1 | 8/2009 | Hsu | |
| 7,665,863 | B2 | 2/2010 | Tseng | |
| 7,775,682 | B2 | 8/2010 | Zhou | |
| 7,798,844 | B2 | 9/2010 | Li et al. | |
| 7,950,840 | B2 | 5/2011 | Liu et al. | |
| 8,376,606 | B2 | 2/2013 | Yu | |
| 8,388,213 | B2 * | 3/2013 | Yu | F21V 3/02 362/267 |
| 8,511,871 | B2 | 8/2013 | Liu et al. | |
| 8,628,215 | B2 | 1/2014 | Tsai | |
| 8,746,953 | B1 * | 6/2014 | Shao | F21V 17/06 362/651 |
| 9,033,548 | B2 | 5/2015 | Tsai | |
| 9,267,651 | B2 | 2/2016 | Tseng | |
| 9,347,657 | B2 | 5/2016 | Chiang | |
| 9,803,851 | B2 * | 10/2017 | Loomis | F21S 4/10 |
| 10,533,738 | B2 * | 1/2020 | Leung | F21V 23/001 |
| 10,584,865 | B2 * | 3/2020 | Loomis | F21V 3/02 |
| 11,009,225 | B2 * | 5/2021 | Loomis | F21V 31/005 |
| 11,015,798 | B2 * | 5/2021 | Loomis | F21S 4/10 |
| 11,231,164 | B2 * | 1/2022 | On | F21K 9/90 |
| 11,287,112 | B2 | 3/2022 | On et al. | |
| 11,371,691 | B2 | 6/2022 | On | |
| 11,454,385 | B2 * | 9/2022 | Loomis | F21V 3/02 |
| 11,493,198 | B2 * | 11/2022 | Loomis | F21V 17/12 |
| 11,499,700 | B1 | 11/2022 | Tsai | |
| 11,946,634 | B2 * | 4/2024 | Loomis | F21V 19/0025 |
| 11,976,813 | B2 * | 5/2024 | Loomis | F21S 4/10 |
| 2006/0109678 | A1 | 5/2006 | Chuang | |
| 2007/0058371 | A1 | 3/2007 | Chen | |
| 2007/0183153 | A1 | 8/2007 | Yu | |
| 2009/0080195 | A1 | 3/2009 | Huang | |
| 2013/0003390 | A1 | 1/2013 | Wu | |
| 2014/0120347 | A1 | 5/2014 | Neumaier | |
| 2015/0300625 | A1 * | 10/2015 | Land | F21V 23/001 362/249.06 |

OTHER PUBLICATIONS

Excerpt of D51 Loomis Deposition Transcript, Case 1:24-cv-03049-MLB, filed Oct. 25, 2024 in the U.S. District Court, Northern District of Georgia, Atlanta Division, 4 pages.

Exhibit 1, Source Code for Website Recited in Defendant's Infringement Contention, Case 1:24-cv-03049-MLB, filed Oct. 25, 2024 in the U.S. District Court, Northern District of Georgia, Atlanta Division, 147 pages.

Exhibit 2, Source Code for Website Recited in Defendant's Infringement Contentions, Case 1:24-cv-03049-MLB, filed Oct. 25, 2024 in the U.S. District Court, Northern District of Georgia, Atlanta Division, 145 pages.

Exhibit 3, Documents Sufficient to Show Operation of Accused Instrumentality, Case 1:24-cv-03049-MLB, filed Oct. 25, 2024 in the U.S. District Court, Northern District of Georgia, Atlanta Division, 37 pages.

Exhibit 4, Prosecution History of U.S. Appl. No. 61/931,360, Case 1:24-cv-03049-MLB, filed Oct. 25, 2024 in the U.S. District Court, Northern District of Georgia, Atlanta Division, 67 pages.

Exhibit A2, Colorized and Annotated Fig. 8 of U.S. Pat. No. 7,775,682 in Case 1:24-cv-03049-MLB, filed Oct. 25, 2024 in the U.S. District Court, Northern District of Georgia, Atlanta Division, 18 pages.

Exhibit B, S4 Lights, 2019 Catalog, Case 1:24-cv-03049-MLB, filed Oct. 25, 2024 in the U.S. District Court, Northern District of Georgia, Atlanta Division, 116 pages.

Exhibit C, S4 Lights, 2020 Catalog, Case 1:24-cv-03049-MLB, filed Oct. 25, 2024 in the U.S. District Court, Northern District of Georgia, Atlanta Division, 114 pages.

Exhibit D2, Pictorial Representation of Figs 1 and 2 of French Patent FR3011910, Case 1:24-cv-03049-MLB, filed Oct. 25, 2024 in the U.S. District Court, Northern District of Georgia, Atlanta Division, 40 pages.

Exhibit H, Dictionary Definition, Case 1:24-cv-03049-MLB, filed Oct. 25, 2024 in the U.S. District Court, Northern District of Georgia, Atlanta Division, 1 page.

Han_Plaintiff's First Amended Response To Infringement Contentions, Case 1:24-cv-03049-MLB, filed Oct. 25, 2024 in the U.S. District Court, Northern District of Georgia, Atlanta Division, 23 pages.

Plaintiff's Invalidity Contentions, Case 1:24-cv-03049-MLB, filed Oct. 25, 2024 in the U.S. District Court, Northern District of Georgia, Atlanta Division, 83 pages.

Plaintiff's Motion for Summary Judgment and Memorandum in Support of Plaintiff's Motion, Case 1:24-cv-03049-MLB, filed Oct. 25, 2024 in the U.S. District Court, Northern District of Georgia, Atlanta Division, 53 pages.

Plaintiff's Response To Infringement Contentions, In Case 1:24-cv-03049-MLB, filed Oct. 25, 2024 in the U.S. District Ccourt, Northern District of Georgia, Atlanta Division, 20 pages.

Plaintiff's Statement of Undisputed Material Facts, Case 1:24-cv-03049-MLB, filed Oct. 25, 2024 in the U.S. District Court, Northern District of Georgia, Atlanta Division, 90 pages.

Non-final Office Action, issued by the USPTO in U.S. Appl. No. 18/312,420, mailed Aug. 23, 2023, 12 pages.

Response to Office Action, filed Nov. 22, 2023, in U.S. Appl. No. 18/312,420, 17 pages.

USPTO File History of U.S. Appl. No. 18/312,420, U.S. Pat. No. 11,946,634, 335 pages.

(56) References Cited

OTHER PUBLICATIONS

Claim Construction Chart for U.S. Pat. No. 11,946,634, filed Dec. 16, 2024 in Case No. 1:24-cv-03049-MLB, 36 pages.
Joint Claim Construction Statement, filed Dec. 16, 2024 in Case No. 1:24-cv-03049-MLB, 33 pages.

* cited by examiner

WATER-RESISTANT WIRED ELECTRO-MAGNETIC COMPONENT CAPTURE

CROSS-REFERENCE TO RELATED APPLICATIONS

This application is a Continuation and claims the benefit of U.S. application Ser. No. 18/312,420, titled "Water-Resistant Wired Electro-Magnetic Component Capture," filed by Loomis, et al., on Mar. 18, 2024, which is a Continuation and claims the benefit of U.S. application Ser. No. 17/933,041, titled "Water-Resistant Wired Electro-Magnetic Component Capture," filed by Loomis, et al., on May 4, 2023 (issued as U.S. Pat. No. 11,978,813 on May 7, 2024), which is a Continuation-in-Part and claims the benefit of U.S. application Ser. No. 17/450,006, titled "Water-Resistant Wired Electro-Magnetic Component Capture," filed by Loomis, et al. on Oct. 5, 2021 (issued as U.S. Pat. No. 11,493,198 on Nov. 8, 2022), which is a Continuation-in-Part and claims the benefit of U.S. application Ser. No. 17/301,850 titled "Water-Resistant Wired Electro-Magnetic Component Capture," filed by Loomis, et al. on Apr. 15, 2021 (issued as U.S. Pat. No. 11,454,385 on Sep. 27, 2022), which is a Continuation and claims the benefit of U.S. application Ser. No. 16/829,937 titled "Water-Resistant Wired Electro-Magnetic Component Capture," filed by Loomis, et al., on Mar. 25, 2020 (issued as U.S. Pat. No. 11,015,798 on May 25, 2021), which is a Continuation and claims the benefit of U.S. application Ser. No. 16/659,302 titled "Water-Resistant Wired Electro-Magnetic Component Capture," filed by Loomis, et al., on Oct. 21, 2019 (issued as U.S. Pat. No. 11,009,225 on May 18, 2021), which is a Continuation and claims the benefit of U.S. application Ser. No. 15/721,004 titled "Water-Resistant Wired Electro-Magnetic Component Capture," filed by Loomis, et al., on Sep. 29, 2017 (issued as U.S. Pat. No. 10,584,865 on Mar. 10, 2020), which is a Continuation and claims the benefit of U.S. application Ser. No. 14/602,526 titled "Water-Resistant Wired Electro-Magnetic Component Capture," filed by Loomis, et al., on Jan. 22, 2015 (issued as U.S. Pat. No. 9,803,851 on Oct. 31, 2017), which claims the benefit of U.S. Provisional Application Ser. No. 61/931,360 titled "Water-Resistant Wired Electro-Magnetic Component Capture," filed by Jason Loomis on Jan. 24, 2014.

This application incorporates the entire contents of the foregoing application(s) herein by reference.

TECHNICAL FIELD

Various embodiments relate generally to water-resistant wired electro-magnetic device enclosures and more specifically to light strings for holidays and decorations.

BACKGROUND

Light strings are widely used during the winter season and during holidays. Wired light strings often adorn holiday trees indoors, and trees and houses outdoors. Such holiday light strings promote a festive atmosphere and bring good cheer to neighborhoods. Light strings often receive power from a wired source, such as an electrical outlet. Each lighting element of a light string must be connected to the power source via one or more wires. The light string therefore typically consists of light elements such as light bulbs or LEDS and wire elements. In some embodiments the lighting elements are wired in a serial fashion. In some embodiments the lighting elements are wired in a parallel fashion. Some light strings use various serial/parallel combinations to distribute operating power to each lighting element.

SUMMARY

Apparatus and associated methods relate to a water-resistant capture device for enclosing wired electro-magnetic components, the capture device having a base module and a connecting cap module, wherein when the base module and cap module enclose an electro-magnetic component and the base module is connected to the cap module, one or more electric wires are compressed within deformable wire apertures formed by the combined base module and cap module. In some embodiments, the base module may be deformable and deform when affixed to the cap module so as to form a compressive water-resistant seal to an interior of the capture device. In an exemplary embodiment, an LED may be captured within the capture device. The cap module may provide a compressing aperture to provide a water resistant seal around the lens of a LED projecting therethrough.

Various embodiments may achieve one or more advantages. For example, some embodiments may provide a method of assembling a light string without the need for molding operations during the assembly process. In some embodiments, the captured electro-magnetic device may be field replaceable. For example, the capture device may be disassembled by hand, and the capture device may be replaced. In some embodiments, the base module may provide strain relief to the wires that reside in the wire apertures. In an exemplary embodiment, the base device may provide for a solderless connection of the electro-magnetic device and wire leads. For example, the base device may have alignment features for positioning a wire assembly for electrical connection to the electro-magnetic device. The alignment features may be topological to provide for tactile feedback as to proper positioning.

In some embodiments, the base device may automatically provide compressive seals to both the wires and to the cap module when coupled to the cap module. This coupling-induced compression may permit the rapid assembly of components. In some embodiments, the coupling between the cap module and the base module may provide for multiple electro-magnetic component sizes. The coupling of various component sizes may provide water resistant capture independent of the component size, within a predetermined component size range. In some embodiments the assembly yield may be improved. Cost reductions may result from such yield improvements. In some embodiments cost reductions may be realized because of the ability to use low cost parts. Inventory methods may be facilitated because, for example, final assembly molding may not be required. Cost reductions may result from manufacturing components at off-site locations from the final assembly locations.

In some embodiments, the sealing feature may have both trough and crest type of interfaces. Such a dual interface may advantageously prevent water penetration in a static configuration. Any water that seeps into a trough may gravitationally be prevented from transgressing the crest. And in another orientation, the trough and crest may exchange relative gravitational roles.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
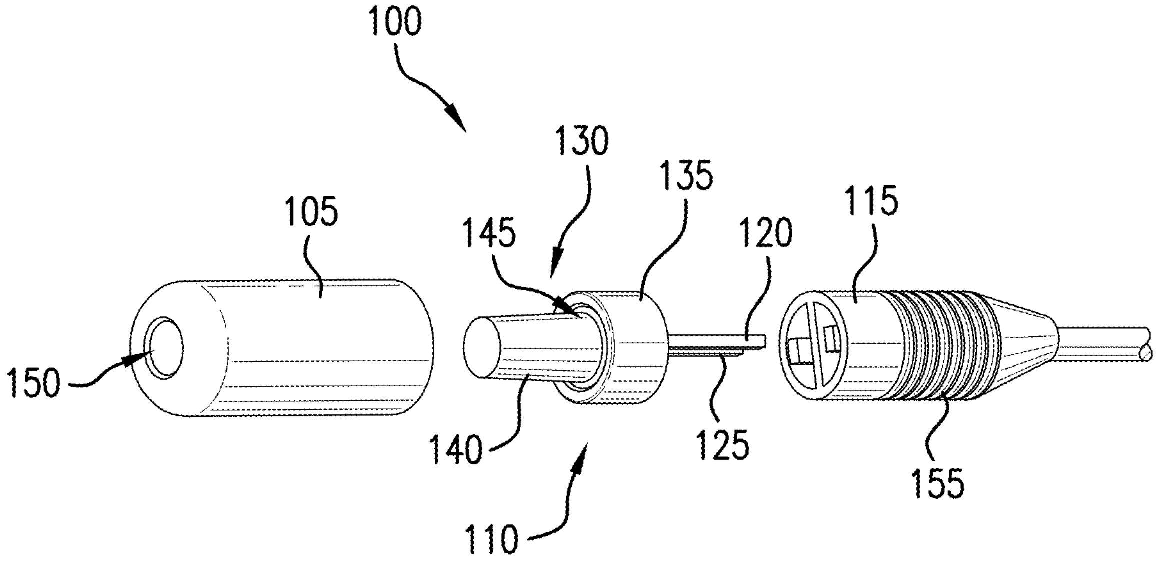
FIG. 1 depicts an exploded view of an exemplary water-resistant lighting element having a tapered LED with moat seal.
Figures 2A, 2B, 2C, 2D:
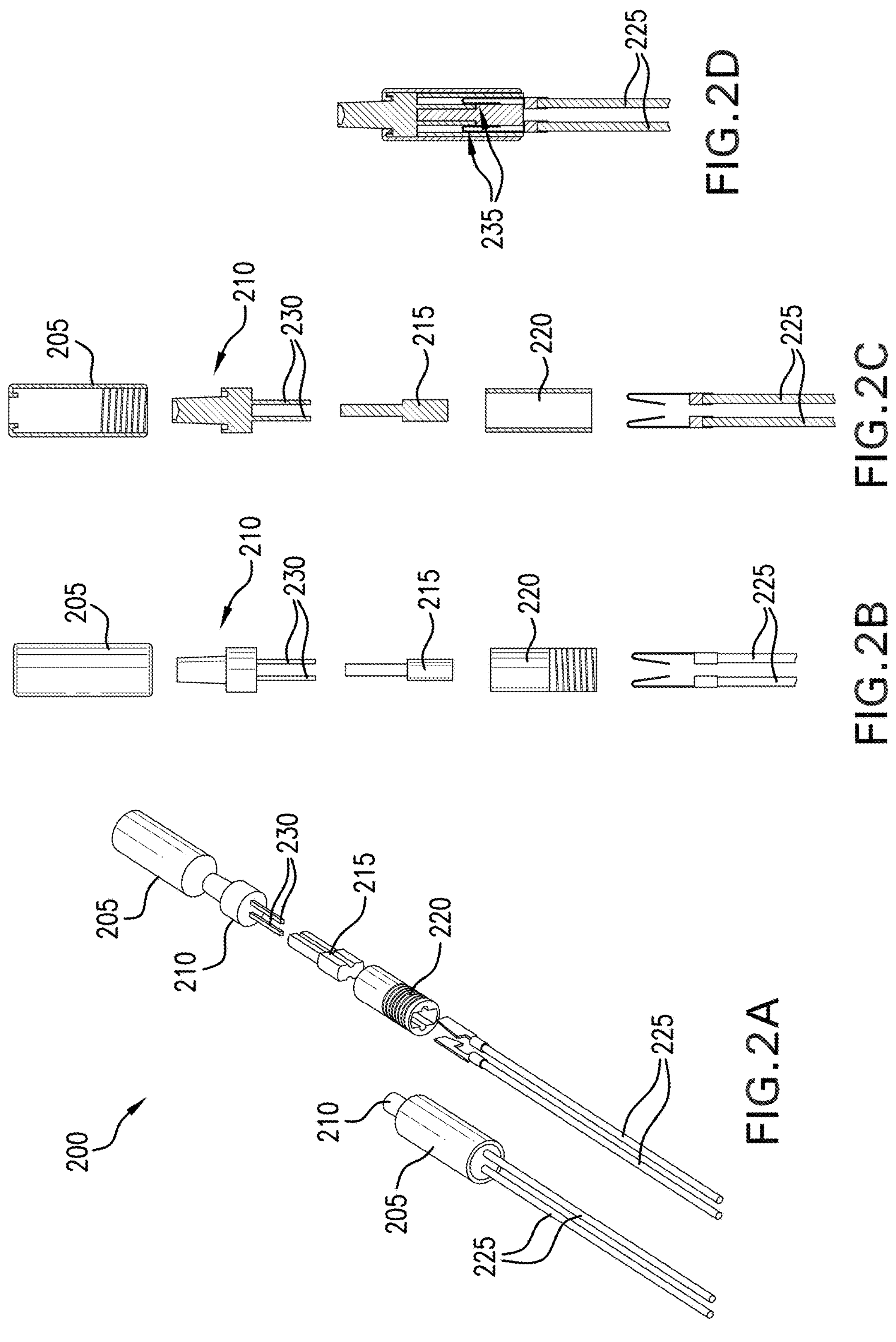
FIGS. 2A, 2B, 2C, and 2D depict exploded views of an exemplary lighting element without integrally molded leads.

FIG. 1 depicts an exploded view of an exemplary water-resistant lighting element having a tapered LED with a moat seal. In the FIG. 1 embodiment, a lighting element 100 includes a LED cap 105, and LED 110, and a molded base 115. The LED 110 has two leads 120, 125 which are configured to be insertable into the molded base 115. The LED 110 has a lens 130 that has a substantially cylindrical base 135 and a tapered head 140. Between the tapered head 140 and the substantially cylindrical base 135 is a moat structure 145. When connected, the LED 110 is inserted into the base 115 and the cap 105 is inserted over the LED and affixed to the base 115. The cap 105 has an aperture 150 through which the tapered head 140 projects. Inside the cap 105, a circumferential inverted moat feature is formed to interface with the moat 145 of the lens 130. The aperture 150 may be sized to compressibly fit against the tapered head 140 when the LED 110 is fully inserted into the cap 105. The fit of the cap 105 against the tapered head 140 provides water resistance for the lighting element 100. The inverted moat feature within the cap 105 may compressibly fit within the moat 145 of the lens 130, which may also promote water resistance. The cap 105 may secure to the base 115 at a threaded portion 155 of the base 115. The threaded portion 155 of the base may provide water resistance to the lighting element 100. This water resistance may be promoted by the use of a deformable material in the molded base 115. The threaded portion 155 may have dimensions that are oversized, or that will result in compression when the cap 105 is secured to the base 115.

FIGS. 2A, 2B, 2C, and 2D depict exploded views of an exemplary lighting element without integrally molded leads. In the FIG. 2 embodiment, an exemplary lighting element 200 includes a cap 205, and LED 210, a lead separation/compression insert 215, a base 220 and two leads 225. The LED 210 may have a tapered head. Each of the lighting elements is shown in cross-section in the right-side view. The light element 200 is assembled with the leads 225 inserted through an opening in the base 220. They are then located adjacent to the lead separation/compression insert 215. The located leads along with the lead separation/compression insert 215 are then inserted back into the opening in the base 220. When inserted into the base 220, the lead separation/compression insert 215 is shaped to provide a cavity 235 for the leads wherein the leads make contact with terminals 230 of the LED 210. When inserted into the base 220, the lead separation/compression insert 215 is also shaped to provide compression to the leads at a bottom of the base 220. This compression may provide water resistance to the lighting element 200. After the located leads and the lead separation/compression insert 215 are inserted into the base 200, the LED 210 can be inserted into the assembly. The LED may then make contact with the leads 225 within the cavity 235. The cap 205 can then be put over the LED 210 and connected to the base 220. An aperture in the cap 205 may compressibly fit the tapered head 230 of the LED 210 to promote water resistance. The LED 210 may have a lens with a moat, and the cap 205 may have an inverse moat in some embodiments. These moat features may provide resistance against the ingress of water, for example, via a distal opening in the cap 205. The cap 205 may screw onto the base 220 in some embodiments. In some embodiments the cap 205 may press or snap onto the base 220. The cap 205 may compressibly fit onto the base 220 to provide resistance against the ingress of water, for example, via a proximal opening in the cap 205.

Figure 3C:
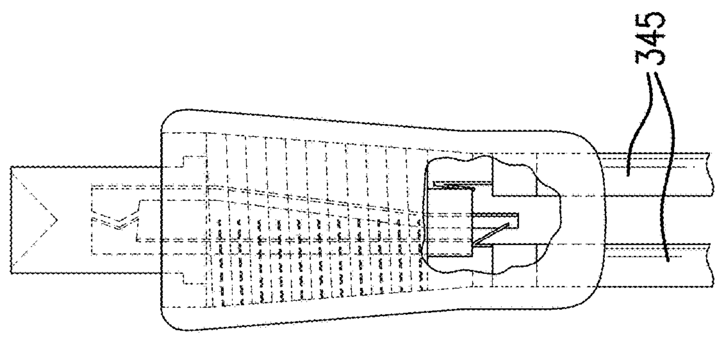
FIGS. 3A, 3B, and 3C depict an exemplary lighting element having a rotationally independent wire connection.
Figure 3B:
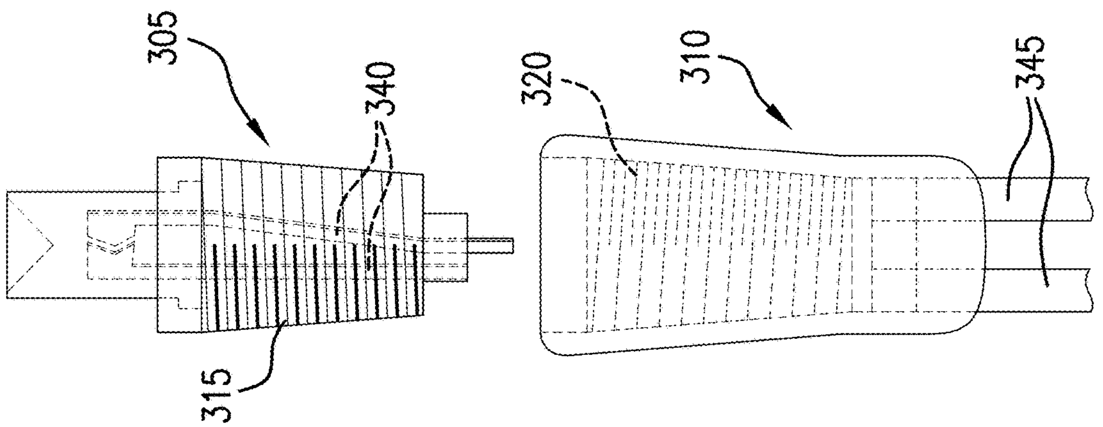
Figure 3A:
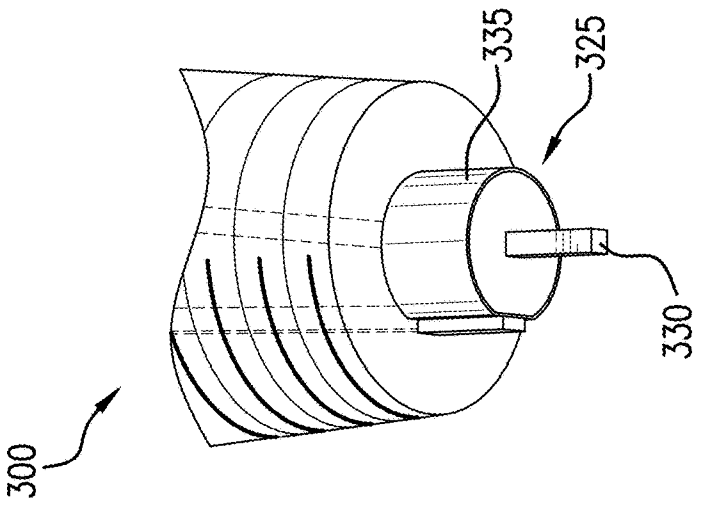
Figure 4D:
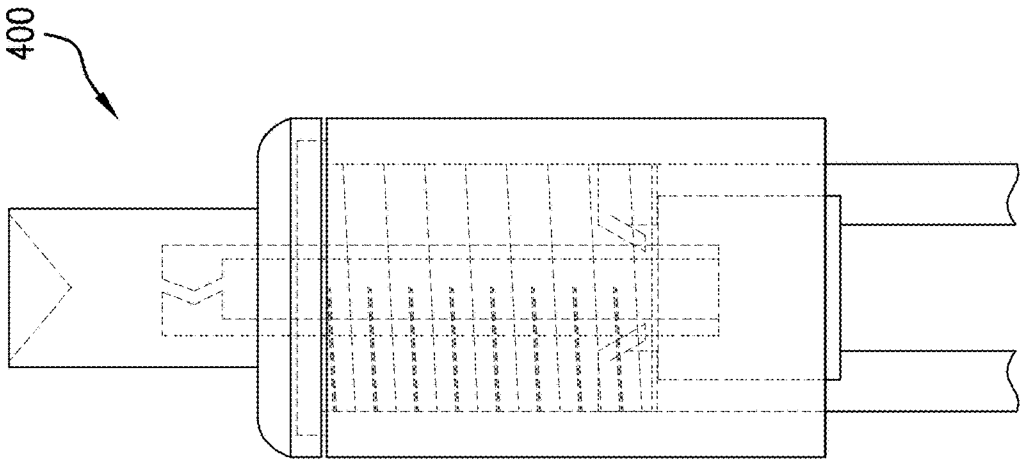
FIGS. 4A, 4B, 4C, and 4D depict an exemplary lighting element having a wire compressing element.
Figure 4C:
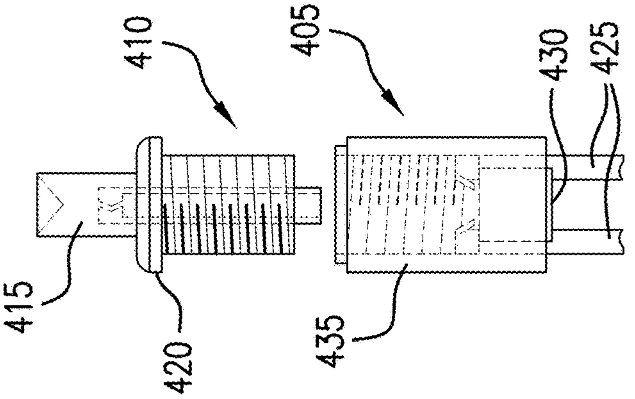
Figure 4B:
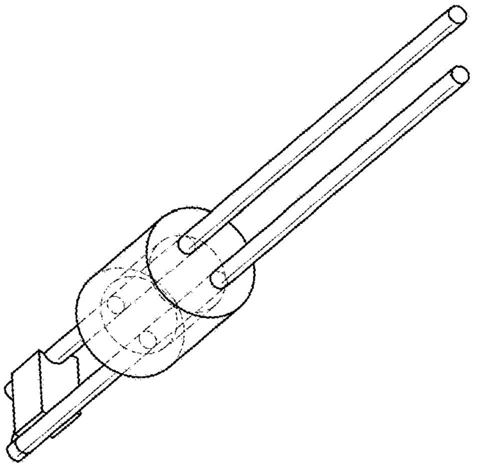
Figure 4A:
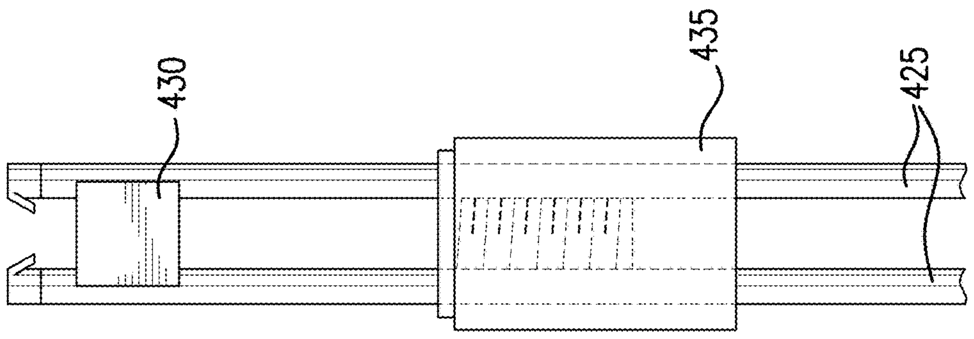
Figures 5A, 5B, 5C, 5D:
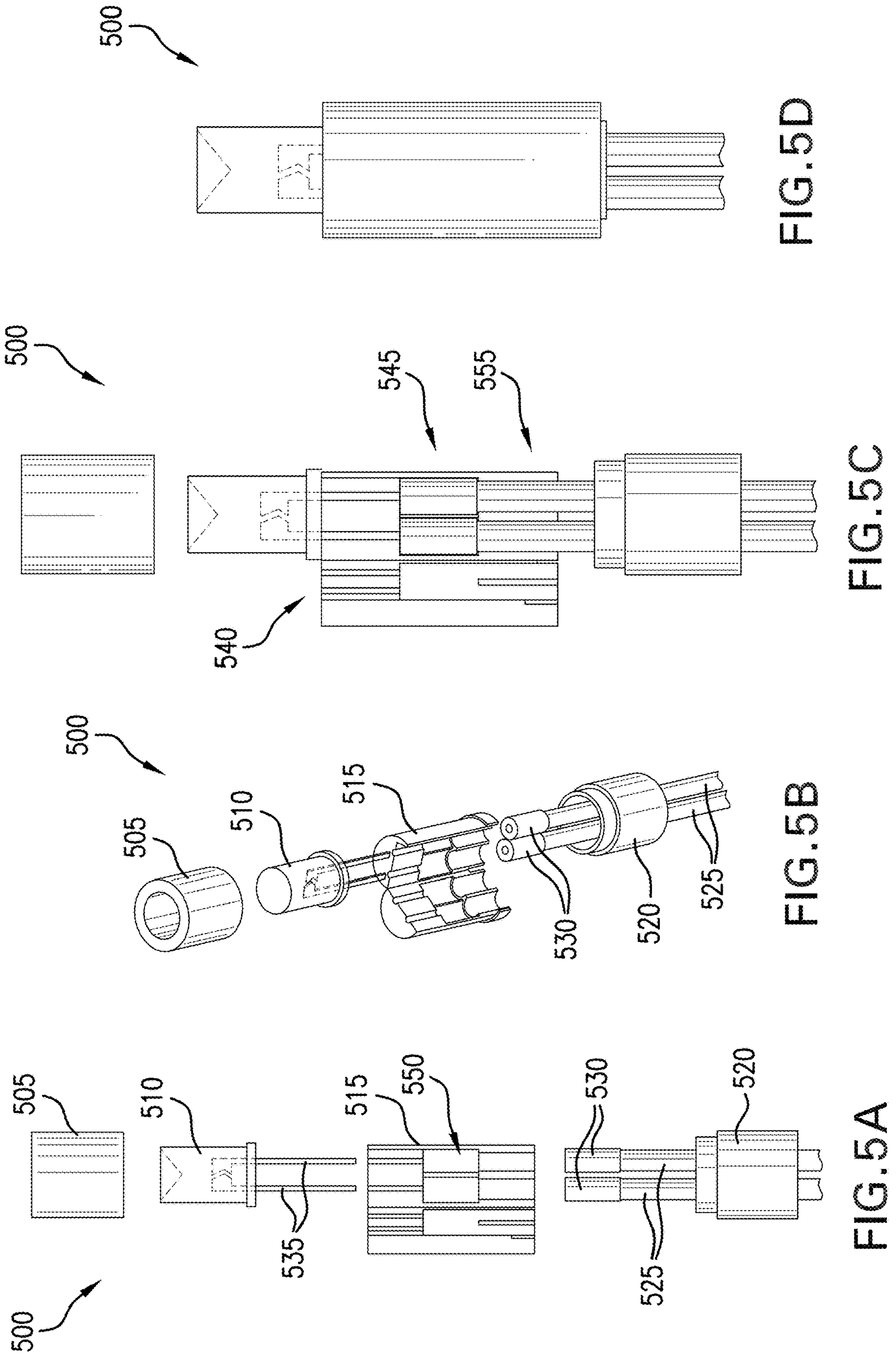
FIGS. 5A, 5B, 5C, and 5D depict an exemplary lighting element with a clam-shell wire securing insert.
Figure 6D:
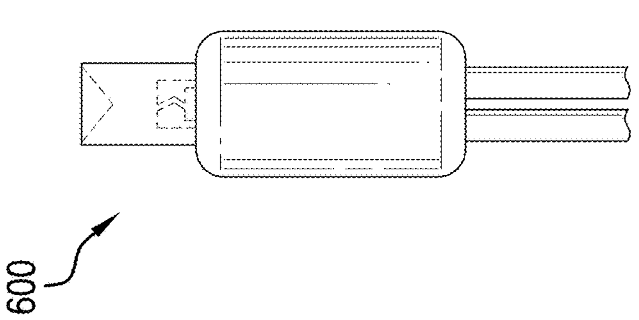
FIGS. 6A, 6B, 6C, and 6D depict an exemplary lighting element with a clam-shell body.
Figure 6C:
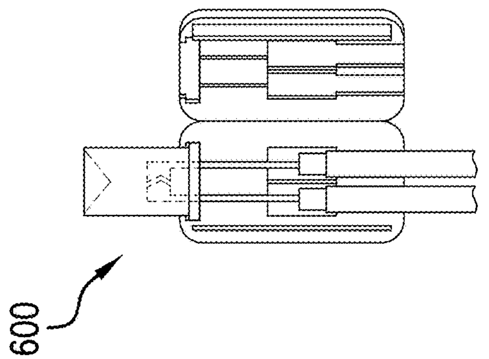
Figure 6B:
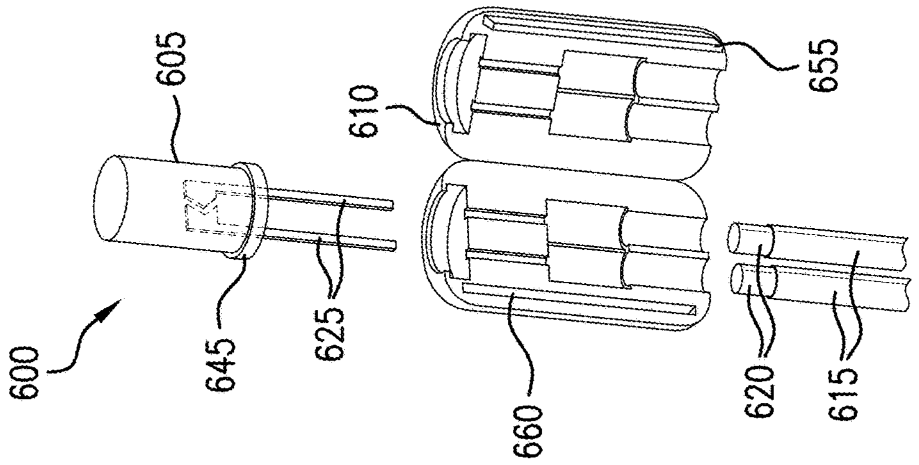
Figure 6A:
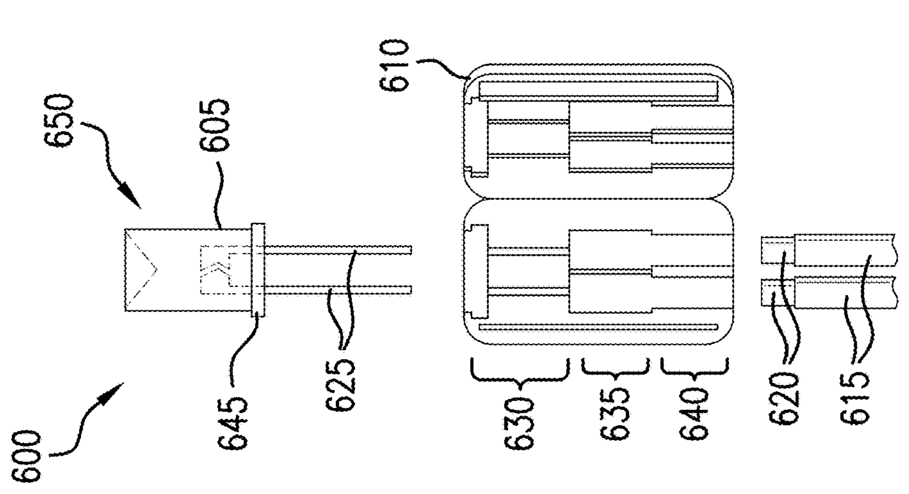

FIGS. 3A, 3B, and 3C depict an exemplary lighting element having a rotationally independent wire connection. In the FIG. 3 embodiment, an exemplary lighting element 300 has an LED insert 305 and a base 310. The LED insert 305 has tapered threads 315. The base 310 has complementary tapered threads 320. The LED insert 305 can be attached to the base 310 via the tapered threads 315, 320. The LED insert 305 has a rotationally invariant electrical connector 325. The rotationally invariant electrical connector 325 has a center contact 330 and a radial contact 335 surrounding the center contact 330. The leads of the LED 340 may be electrically connected to the center contact 330 and the radial contact 335 according to a predetermined polarity convention. Wire leads 345 within the base 310 may have contacts located so as to connect one of the wire leads 345 to the center contact 330 and the other of the wire leads 345 to the radial contact 335. The tapered threads 315, 320 may provide a compression fit and may promote water resistance of the lighting element 300.

In some embodiments, a lighting element may include a LED insert and a base. The LED insert may have threads, for example. The base may have complementary threads. The LED insert can be attached to the base via the threads. The LED insert may have an LED that has two conductive leads. The conductive leads may project through a bottom of the LED insert. Electrical wires within the base may provide contacts which are located to contact the projecting LED leads when the LED insert is connected to the base. The threads of the LED insert may have a predetermined configuration so as to ensure that when the LED insert is fully screwed into the base, the LED leads will align with the contacts of the base electrical wires. A proper polarity of the connection may be determined by the thread dimensions, for example.

FIGS. 4A, 4B, 4C, and 4D depict an exemplary lighting element having a wire compressing element. In the FIGS. 4A, 4B, 4C, and 4D embodiment, a lighting element 400 includes a base assembly 405 and a light assembly 410. The light assembly 410 includes an LED 415 and a threaded insert 420. The base assembly 405 includes two wire leads 425, a wire separator 430 and a base housing 435. The wire leads 425 may by inserted through a slotted aperture in the bottom of the base housing 435. The wire separator may then be inserted between the two wire leads 425. The separator 430 and the two wire leads 425 may then be located into the base housing 435. The wire separator 430 may be sized to provide compression of the wire leads 425 between the wire separator 420 and the base housing 435. The light assembly 410 may then be inserted into the base assembly 405. In some embodiments the light assembly 410 may snap into the base assembly 405. In some embodiments, the insertion into the base assembly may be keyed to provide for proper polarity connection between the LED 415 and the wire leads 425.

FIGS. 5A, 5B, 5C, and 5D depict an exemplary lighting element with a clam-shell wire securing insert. In the FIGS. 5A, 5B, 5C, and 5D embodiment, an exemplary lighting element 500 includes an LED cap 505, an LED 510, a clam-shell 515, a base 520 and two wires 525. Each of the two wires 525 has a connector 530 configured to receive a lead 535 of the LED 510. The clam-shell 515 is configured to capture the connection of the connectors 530 and the leads 535 of the LED 510. The clam-shell 515 has a top region 540 through which the LED leads 535 project. The clam-shell 515 has a middle region 545 which when closed creates a cavity 550 sized to contain the connectors 530 of the wires 525. The clam-shell 515 has a bottom region 555 which is configured to compress the wires when the clam-shell 525 is closed.

To assemble the lighting element 500, the wires 525 may be inserted through an aperture in the base 520. The wires 525 may then be aligned to the clam-shell 515 and the clam-shell 515 may then be closed. The wire containing clam-shell 515 may then be retreated back into the base 520. When the clam-shell 515 is inserted into the base 520, the base may put the clam-shell 515 into compression. This compression of the clam-shell 515 may in turn provide compression to wire insulation surrounding the wires 525. This compression may provide for water resistance to water incident upon the wire/clam-shell interface. The LED leads may be inserted into apertures in the top of the clam-shell. The apertures in the top of the clam-shell 515 may be sized to receive the LED leads 525 and direct the leads to the connectors 530. After the LED 510 is attached to the assembly, the LED cap 505 may be inserted over the LED 510 and couple to the base 520. In some embodiments the LED cap 505 may compressibly fit around a base of a lens of the LED. This compression fit around the base of the LED may substantially prevent water from entering the light assembly 500 from without. In some embodiments, the LED cap 505 may compressibly fit around the base 520 so as to facilitate water resistance at the base 520.

FIGS. 6A, 6B, 6C, and 6D depict an exemplary lighting element with a clam-shell body. In the FIGS. 6A, 6B, 6C, and 6D embodiment, an exemplary lighting element 600 includes an LED 605, a clam-shell body 610 and two wires 615. Each wire 615 has a connector 620 configured to connect to a lead 625 of the LED 605. The clam-shell 610 has three regions, a LED-compression region 630, a connection-cavity region 635 and a wire-compression region 640. The LED-compression region 630 is configured to put a cylindrical base 645 of a lens 650 of the LED 605 into compression when the clam-shell is closed. The connection-cavity region 635 is configured to capture the connectors 620 within the clam-shell body 610, while permitting the clam-shell to fully close. The wire-compression region 640 is configured to compress the wires 615 when the clam-shell body 610 is closed. The clam-shell body has a snap feature 650, 655, one along the length of the body on each side of the open clam-shell 610. These snap features 655, 660 are configured to couple to one another and to provide for a secure connection of two sides of the clam-shell 610 when closed.

Figure 7A:
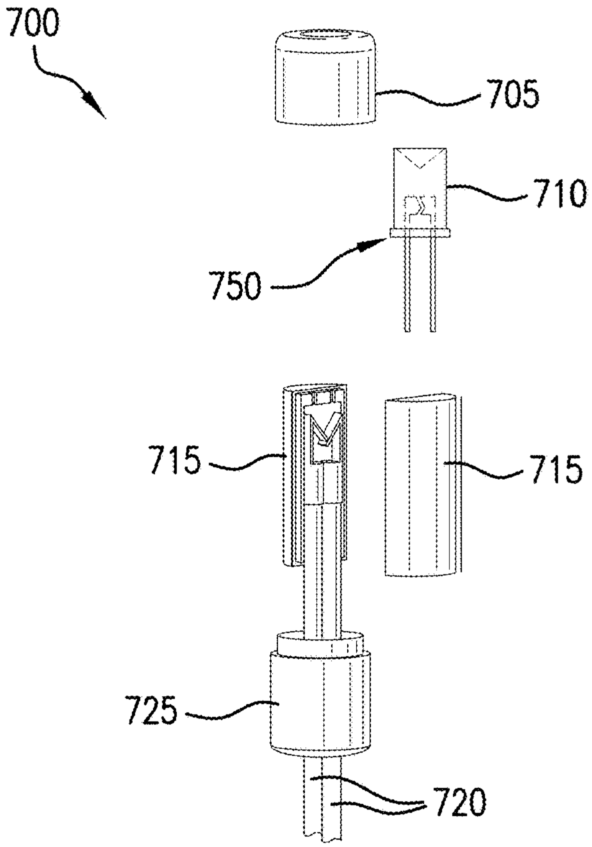
FIGS. 7A and 7B depict an exemplary lighting element having a sandwich insert.
Figure 7B:
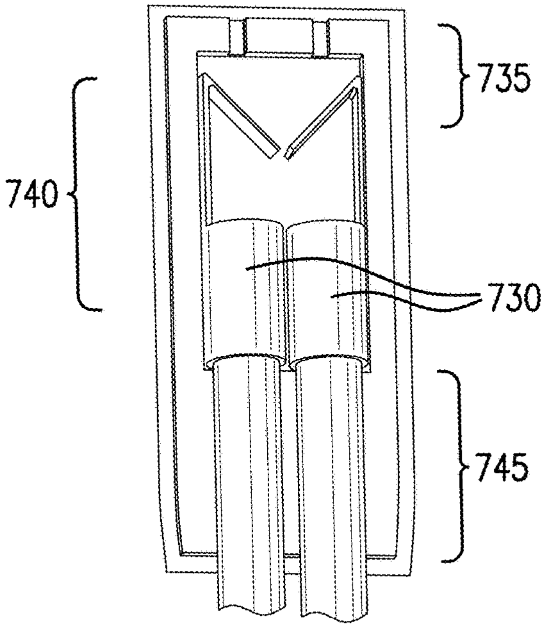

FIGS. 7A and 7B depict an exemplary lighting element having a sandwich insert. In the FIGS. 7A and 7B embodiment, a light unit 700 has a cap 705, and light element 710, two sandwich captures 715 two wires 720, and a base 725. Each of the two wires 720 has a wire connector 730. The two wires 720 may be first placed into one of the sandwich captures 715. The sandwich capture assembly has three regions, an LED-lead region 735, a connector-cavity region 740, and a wire-lead region 745. When the two wires 720 have been properly located onto one of the sandwich captures 715, the two sandwich captures 715 are affixed to one another. In some embodiments the sandwich captures have means for snap connecting to each other. In some embodiments, the sandwich captures have locating features, which provide tactile feedback indicative of proper alignment. The sandwich captures 715 along with the captured wires 720 may then be inserted into the base 725. The base 725 may provide compression to the sandwich captures 715. When the sandwich captures 715 are inserted into the base 725, the wire-lead region 745 may squeeze the wires 720. The wire-lead region 745 may be compressed, both together and against the wires 720 so as to provide water resistance.

In some embodiments, the light unit 700 is depicted from a side perspective. Here, the wires 720 are shown being located in sandwich captures 715. The sandwich captures 715 may be closed upon the wires 720. A water resistant seal may result near the location where the wires 720 enter into the sandwich captures 715. The sandwich captures 715 may be sized to both squeeze insulation surrounding the wires 720, and to press against each other. The base may be sized to provide compression to the sandwich captures 715. This compression may result in a water resistance seal at the bottom of the sandwich captures 715. The LED 710 may project from the sandwich captures 715 after insertion into the top of the sandwich captures 715. The leads of the LED 710 may contact the wire connectors 730 in the connector-cavity region 740 of the wire captures 715. The cap 705 may be connected to the base 725. When assembled, the cap 705 may compress a cylindrical base 750 of the LED 710. In some embodiments, the cap 705 may compress the wire captures 715. In an exemplary embodiment, the cap 705 may connect to the base 725. The cap 705 may be attached to the base 725 with an adhesive in some embodiments. In some embodiments, the cap 705 may be press fit to the base 725. In an exemplary embodiment, a circumferential ridge on one of the members may mate with a circumferential valley on the other member. In some embodiments, a tactile snap may indicate that the two members have been successfully attached to one another. In some embodiments, both the cap 705 and the base 725 may have complementary screw threads to attachment. In an exemplary embodiment, the screw threads may be of a tapered nature to facilitate a tight seal between the two members. For example, the diameter of the base 725, upon which the threads are formed, may increase with each rotation of engagement. In this way, the cap 705 may increasingly tighten as it is being rotated onto the base 725.

Figure 8A:
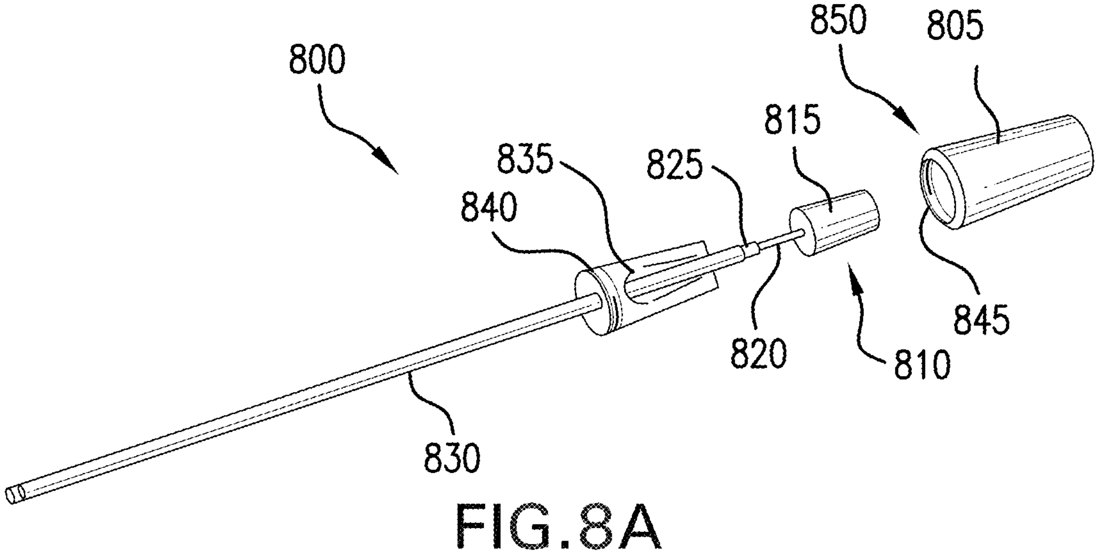
FIGS. 8A, 8B, and 8C depict an exemplary lighting element having a wire compression element.
Figure 8B:
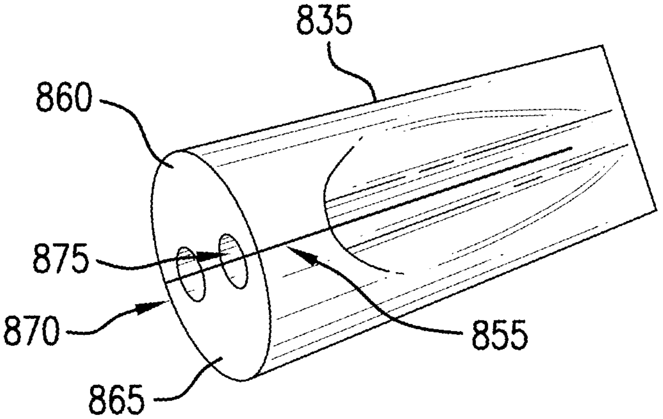
Figure 8C:
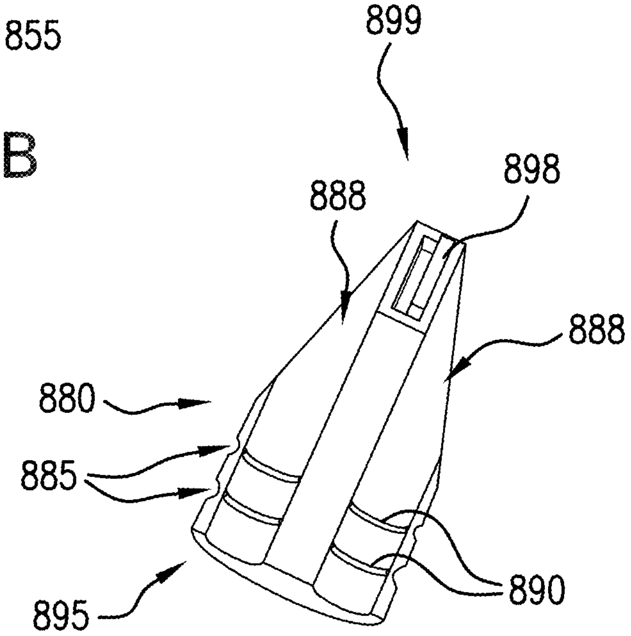

FIGS. 8A, 8B, and 8C depict an exemplary lighting element having a wire compression element. In the FIG. 8A embodiment, an exploded view of an exemplary lighting element 800 is depicted. The lighting element 800 includes a tapered cap 805. The lighting element 800 has an LED 810 with a tapered lens 815. The LED 810 has leads 820 shown connected to contacts 825 of wires 830. A base 835 is shown positioned to be inserted between the wires 830. The base 835 is shown with threads 840 which may mate with complementary threads 845 in the tapered cap 805. The threads 845 of the tapered cap 805 may follow the taper of the cap 805. For example, as one travels along the threads from a bottom end 850 of the cap 805 inwardly, the diameter of each subsequent spiral becomes smaller. In some embodiments, the threads 840 of the base 835 may be on a tapered base 835. In some embodiments, the threads 840 may follow the taper of the base 835.

FIG. 8B depicts an exemplary lighting element having a split wire compression element. Here, an exemplary base 835 is shown in isolation. This exemplary base 835 is depicted with a split 855 along a portion of a longitudinal length. The split 855 may divide the base 835 into substantially equally sized halves 860, 865. The base 835 may snap into a cap 805. When inserted into the cap 805, the cap 805 may put the two halves 860, 865 into compression with one another. When in compression, two wire apertures 870, 875 may compress wires that have been inserted. Various means for connecting the base to the cap may be used. In some embodiments, a circumferential lip extending inwardly around the inside of the bottom end of the base may provide the tactile snap indicating proper insertion of the base 835 into the cap 805. In some embodiments, a circumferential ridge around one of the members may mate with a circumferential groove in the other member. In some embodiments, complementary screw threads may be molded into the two members. In some embodiments, the taper of one or both members may facilitate compression. Such compression may provide a water resistant seal to the lighting element 800.

In some embodiments, an exemplary base may have threads at a bottom portion of the base. An exemplary cap may have complementary threads at a bottom portion of the cap. Wire leads may be inserted into the base. Electrical wires may be inserted into an exemplary base. Leads of an LED may be electrically connected to the wires within the base. An exemplary cap may have a lumen through which the LED may be inserted. The cap may attach to the base. When the cap attaches to the base, the cap may compress the LED. Circumferential compression around the LED may provide water resistance at this compressed location. When the cap attaches to the base, the base may be put into compression. The compression of the base may in turn compress insulation surrounding the wires. The compression of the base may also create a circumferential seal between the base and the cap.

In some embodiments, an exemplary lighting unit may include a two-piece wire spacer. The two-piece wire spacer may captured two wires and may be located adjacent to an LED which is connected to the wires. A two-piece wire spacer may have one or more circumferential valleys. The LED husk may have one or more corresponding circumferential ridges on the inside of its lumen. The husk ridges may mate with the spacer valleys when the husk is connected to the two-piece wire spacer. Having one or more ridges and the corresponding valleys may provide a water-resistant seal between the husk and the two-piece wire spacer.

In some embodiments an exemplary LED husk may have one or more circumferential husk ribs near a bottom end of the husk. The husk ribs may mate with substantially complementary circumferential moat features on a base element. The husk has a tapered profile with a wall thickness. The husk may have a micro-flashing feature at a top end of the husk. The micro-flashing feature may be compressed when an LED is inserted into the husk. This compression of the micro-flashing feature may provide a water resistant seal between the husk and the LED.

FIG. 8C depicts a close-up view of one piece of an exemplary two-piece wire spacer plug. In the FIG. 8C embodiment, an exemplary sandwich piece 880 of a two-piece wire sandwich is depicted. The sandwich piece 880 is shown with two semi-cylindrical wire apertures 885 along a longitudinal length. Each semi-cylindrical wire aperture 885 has two semi-cylindrical ribs 890 near a wire end 895 of the sandwich piece 880. Each semi-cylindrical rib 890 may locally compress insulation surrounding a wire located in the semi-cylindrical wire aperture 885. The sandwich piece 880 has a registration key 898 near an LED end 899 of the sandwich piece 880. The sandwich piece 880 may be joined with a second identical sandwich piece 880 placed in a key-to-key fashion. By doing so, the semi-cylindrical wire apertures 895 of the two joined sandwich pieces 880 may form a substantially cylindrical wire aperture. The semi-cylindrical ribs 890 of the joined sandwich pieces 880 may form substantially cylindrical ribs circumscribing wires inserted into the substantially cylindrical wire apertures. The substantially cylindrical ribs may cylindrically compress wire insulation of the inserted wires. This compression may result in a water resistant seal between the sandwich pieces 880 and the inserted wires. The sandwich piece 880 also has semi-cylindrical moats 865 in the exterior face of the sandwich piece 880. These semi-cylindrical moats 865 of the joined sandwich pieces 880 may form substantially cylindrical moats circumscribing the outside faces of the joined sandwich pieces 880. These moats may be configured to be coupled with substantially complementary rib features on a cap element.

In some embodiments, a wire compression piece may have one or more elliptical grooves 865. Each elliptical groove 865 may have a varying groove depth with respect to an exterior surface of the wire compression piece. The groove depth varies as a function of the angular location about a wire-end of the wire compression piece. In the depicted embodiment, each elliptical groove 865 may be deepest near a split demarking two halves of the wire compression piece. The elliptical groove may be shallowest at a location approximately ninety degrees from the split. An LED cap having two substantially complementary ribs around the wire end of the cap may be attached to the wire compression piece. In some embodiments, the LED cap may have substantially uniform rib heights with respect to an inside surface of the LED cap. In such an embodiment, the attachment of the LED cap to the wire compression piece may preferentially compress the two halves together. This compression may create a water resistant seal between the two halves of the wire compression piece.

In some embodiment, a split wire space plug may have a crumple feature. The crumple feature may be compressed when the split wire space plug is coupled to an LED cap capturing an LED.

Figure 9A:
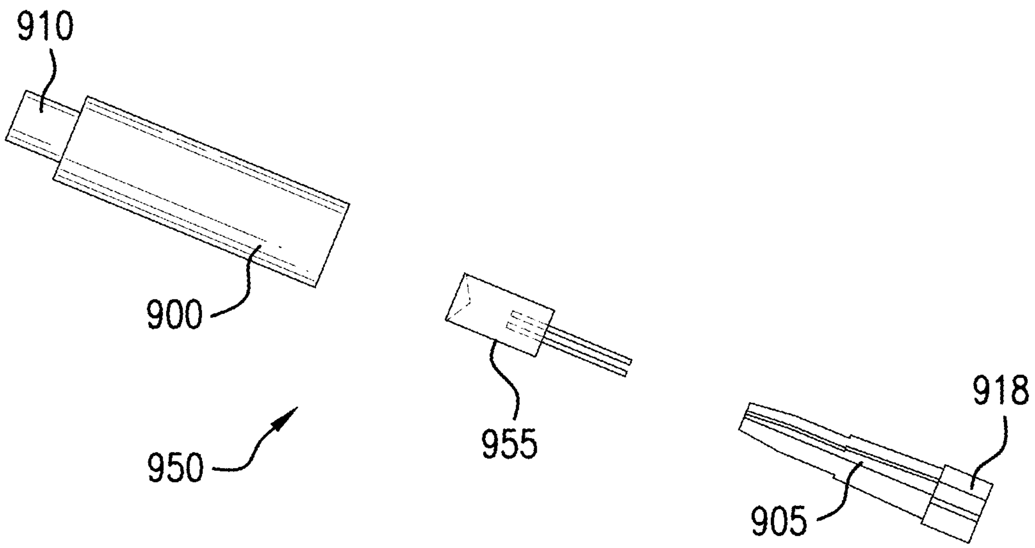
FIGS. 9A and 9B depict an exemplary wire-lead plug and an exemplary LED husk.
Figure 9B:
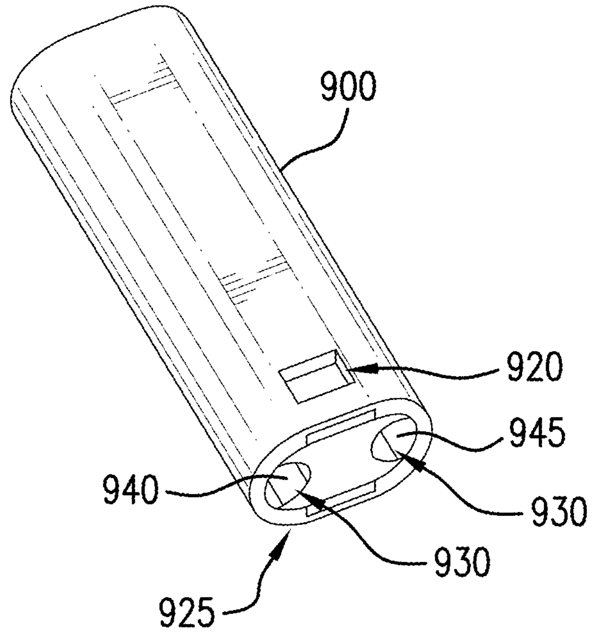

FIGS. 9A and 9B depict an exemplary wire-lead plug and an exemplary LED husk. In the depicted embodiment, an exemplary LED husk 900 and an exemplary clip-in plug 905 are shown. The clip-in plug 905 may facilitate connection between an LED and a pair of wires. The clip-in plug 905 may then be inserted into the LED husk 900. The LED husk 900 may have an LED aperture through which a top of a lens of the LED may project. In the depicted embodiment, a clear cap 910 permits light to transmit through the husk 900. The clip-in plug 905 may have a securing clip 915 which may snap into a clip aperture 920 in the LED husk 900 when inserted. FIG. 9B depicts the exemplary clip-in plug 905 has been inserted into the LED husk 900. The insertion of the clip-in plug 905 to the LED husk 900 may cause compression between the LED husk 900 and a captured LED. The connected clip-in plug 905 and LED husk 900 combination may also provide compression at a wire-end 925 where the two members are adjacent to one another. Two wire apertures 930 are formed when the clip-in plug 905 and the LED husk 900 are mated. These apertures may compress inserted wires between an inside wall 940 located on the clip-in plug 905 and an outside wall 945 located on the LED husk 900.

In the depicted embodiment, an exemplary lighting element 950 includes a clear cap 900, an LED 955, and a plug 905. In this embodiment, the LED 955 may be connected to electrical wires located along the plug 905. The assembly may then be inserted into the clear cap 900. The plug 905 and the clear cap 900 may then have a compression interface at a wire end 925 of the plug 905. In some embodiments, only a top cylindrical portion of the clear cap 900 may be translucent or transparent. In some embodiments the entire clear cap may be translucent or transparent.

Figure 10A:
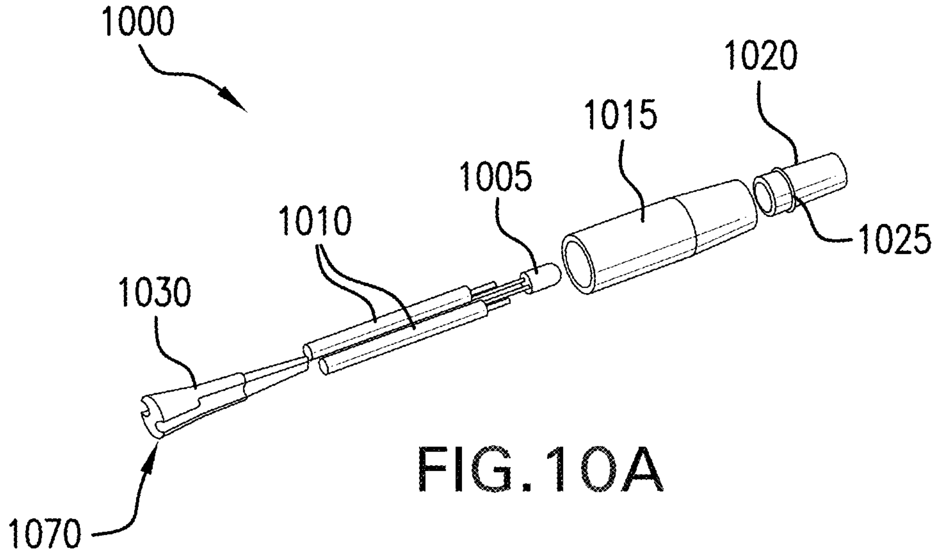
FIGS. 10A and 10B depict an exemplary exploded lighting element which uses an injected sealing agent.
Figure 10B:
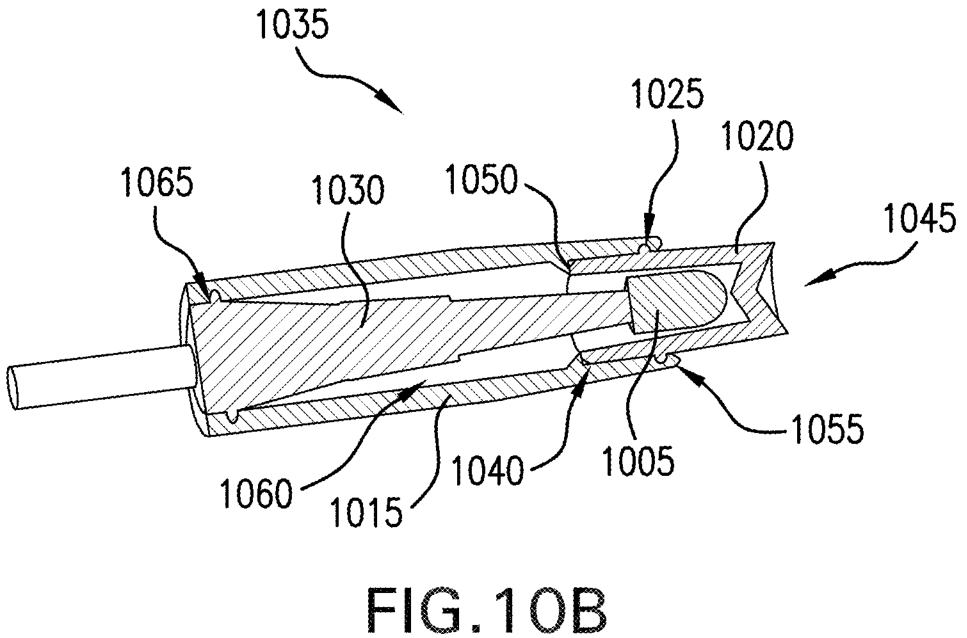

FIGS. 10A and 10B depict an exemplary exploded lighting element which uses an injected sealing agent. In the FIGS. 10A and 10B embodiment, an exemplary exploded light string element 1000 includes an LED 1005 which is attached to two lead wires 1010. The LED 1005 and lead wires 1010 may be inserted into a light enclosure during assembly. The light enclosure is depicted as having two components, a lampholder 1015 and a lens 1020. The lens 1020 may have an annular projection 1025 for providing assembly location with a complementary annular feature (not depicted) within the lampholder 1015. The annular projection 1025 may provide a water resistant connection with the lampholder 1015 when properly coupled to the lampholder 1015. The assembled lampholder 1015 and lens 1020 combination may receive an injection of a sealing agent and the LED 1005 and lead wires 1010 may be inserted into the assembly. Various types of sealing agents may be used. By way of example and not limitation, various epoxies, rubber cements, or urethanes may be used. The sealing agents, when cured or dried may provide a water resistant seal within the light string element 1000. A plug 1030 may be inserted after or along with the insertion of the LED 1005 and lead wires 1010. The plug 1010 may provide a compression fit between the lead wires 1010 and the lampholder 1015.

In the FIG. 10B embodiment, an assembled light string element 1035 (without the lead wires) is shown. In some embodiments a lampholder 1015 may be made of an opaque material. For example, a colored polypropylene may be used. Variously colored dies may provide decoratively colored lampholders 1015. In some embodiments, the lampholder 1015 may be preassembled to a lens 1020. In some embodiments, the preassembly may include inserting a lens 1020 into a lensholder 1015. In some embodiments, the lens 1020 may be coated with an adhesive prior to assembly. In some embodiments the lensholder 1015 may be molded onto the lens 1020. The lens 1020 may be made of any of a variety of transparent or translucent materials. For example, the lens 1020 may be made of acrylic. In some examples, polycarbonate lenses may be used. In some embodiments the lens 1020 may be made of glass. The assembled enclosure may then include both the lens 1020 and the lampholder 1025.

In these depictions, an exemplary lens cap 1020 is shown. Various sizes and types of lens caps 1020 may be used. For example, standard sized lens caps, such as, for example, C5, C6, or M7 lens caps may be used. Non-standard sizes may be used in some embodiments. A three-millimeter wide-angle lens cap may be used. In some embodiments, one or more annular feature 1025 may encircle the lens near a base region 1040 of the lens 1020. The lens may be concave, flat or convex at an illumination region 1045 of the lens 1020.

FIG. 10B depicts a cross section of an exemplary assembled lighting element which uses an injected sealing agent. In the FIG. 10B embodiment, an exemplary assembled lighting element 1000 includes an LED 1005 inserted into a lighting housing. The LED 1005 is inserted into a lens 1020 of the lighting housing. The lens 1020 has been coupled to a lampholder 1015. The lampholder 1015 has a shelf 1050 which provides and end-point stop for the insertion of the lens 1020. A protruding annular feature 1025 on the lens 1020 mates with a complementary recessed feature 1055 on the lampholder 1015 when the lens 1020 is inserted into the lampholder 1015. The mating features 1050, 1025, 1055 may provide a standard interface for a variety of lens designs. An adhesive sealant may have been injected into an internal cavity 1060 of the lighting housing. The sealant may substantially surround the LED and provide water resistance to the assembly. A plug 1030 may contain the sealant while the sealant is curing or drying. The complete assembly may be transported or moved during assembly even before the sealant is fully cured or set up.

This figure shows the mating interface between an exemplary plug 1030 and an exemplary lampholder 1015. In some embodiments an annular ring 1065 may project for the substantially cylindrical surface of the plug 1030. In some embodiments, the annular ring 1065 may project a predetermined distance into lead wire channels 1070 to project into the insulation covering the lead wires.

In an illustrative embodiment, the each LED may be secured the LED 955 may be secured within the cap 900 with epoxy. In some embodiments the LED may be secured to the plug 905 with epoxy. The epoxy may be a transparent epoxy in some exemplary embodiments. In some embodiments, the epoxy may be a translucent epoxy. The epoxy may seal the assembly. In some embodiments the epoxy seal may make the assembly water resistive. The enclosed assembly may securely contain the liquid epoxy until the curing process is complete. The enclosed assembly may advantageously permit automation of epoxied light strings, as the epoxy remains confined within the assembly during curing.

An exemplary manufacturing process may proceed using one or more of the following processing steps. The lampholder 1015 may be mated with the lens 1020 at one particular manufacturing facility. For example, polypropylene lampholders 1015 may be molded onto acrylic lenses. At a second manufacturing site, the LEDs 1005 may be galvanically bonded to the lead wires 1010, in a contiguous chain fashion. A spool of connected LEDs 1010 may be the end product of this manufacturing step. Both of the above manufactured sub-assemblies may then be shipped to a final assembly site, where first a plug 1030 may be inserted into each LED 1010 of the lead-wire 1010 connected chain of LEDs 1010. A controlled dose of an epoxy may be injected in the lampholder/lens assemblies, and then each LED/plug inserted into the lampholder/lens enclosure, capturing the still liquid epoxy. As each LED element is completed, the LED element may be safely moved during the assembly of subsequent LED elements in the chain, as each finished LED element securely captures liquid epoxy within the internal cavity.

Although various embodiments have been described with reference to the Figures, other embodiments are possible. For example, in some embodiments the base may include two sandwich pieces. In an exemplary embodiment, the base may include a single piece with a split to permit the insertion of wires. In some embodiments, the base may be of clamshell construction. In some embodiments, the wires may be completely circumscribed by the base element. In some embodiments, the wires may be pressed between the base element and a cap element. In some embodiments, a moat/rib structure may provide connection between the base and the cap elements. In an exemplary embodiment, a double moat/rib structure may provide connection. Some embodiments may have three or more moat/rib structures. In some embodiments, an array of parallel moats may circumscribe a member. The two members may be pressed together until the captured LED "bottoms out." When the captured LED is tightly contained, whatever moat/rib interfaces that are used may provide the connection/seal of the members. For example, a certain lot of LEDs may be modestly longer that the typical lot. Thus, when connected, the rings of moats that interface the rib rings may be one or more ring pitch locations different from the typical build. The resulting ring/moat interface may still provide a good water resistant seal.

In an exemplary embodiment, more than two wires may be compressed each within a deformable wiring aperture. In some embodiments, the cap may be electrically conductive and may carry current along with one or more wires. For example, some embodiments may have 1, 2, 3, 5, 8 . . . or more, such as any practical number of wire apertures, for example.

In various embodiments, different types of electro-magnetic devices may be captured within a capture device. For example, in some embodiments the electro-magnetic device may be a transducer or a sensor. In one exemplary embodiment, a magnetic sensor may be captured within the capture device. In some embodiments, the cap may have a magnetic permeability greater than one. In some embodiments, the cap may have a high dielectric coefficient, for example. In various embodiments the cap may have a transparent portion. In some embodiments the cap may have a colored translucent portion, for example.

In an exemplary embodiment, a water-resistant capture device for enclosing a wired electro-magnetic component may include a base module. In some embodiments, the capture device may include a cap module that is configured to connect to the base module. The base module may have two connected halves being defined by a split. The split may permit the wire apertures to be opened so as to permit the introduction of a wire, without having to cut the wire. In some embodiments, the wire apertures may be split into two substantially equal halves. The wire apertures of the base module may be compressed when the base module is connected to the cap module. This wire-aperture compression may be configured to compress a wire having a predetermined diameter when introduced into the wire aperture. When the base module is connected to the cap module, an interior cavity may be sized to accommodate an electro-magnetic component of a predetermined size and geometry. In some embodiments, a device aperture in the cap module may provide an enclosed electro-magnetic component fluid communication with the ambient. In some embodiments, the aperture may have a deformable sealing surface against which the component is compressed when the cap module as attached to the base module.

In some embodiments, an exterior lens may be attached over the LED lamp. For example, in some embodiments, the LED cover may have a lens connector to which a lens may be affixed. In some embodiments a C6 type lens may substantially surround an illuminated portion of an LED, for example. In some embodiments other lens sizes and/or designs may be attached to a light string. In some embodiments, the exterior lenses may be replaceably attached to the LED assemblies. In an exemplary embodiment a C9 type lens may be attached. The replaceable lenses may permit an end user of a light string to select the color and/or shape and/or size of the exterior lens, for example. In some embodiments, the lens may attach in an attachment aperture that is slightly undersized so as to provide a water tight seal. Various embodiments may attach the exterior lens using a variety of couplers. For example, an exterior lens may be threaded and secured to a lamp assembly by screwing it to threads manufactured on the assembly. In some embodiments, the LED may be secured in the husk in a water resistant manner. In such embodiments, the exterior lamp may not use a water resistant coupler. In some embodiments, however, the lamp may be coupled in a water resistant manner providing a second barrier to water.

Apparatus and associated methods relate to a water-resistant capture device for enclosing wired electro-magnetic components, the capture device having a base module and a connecting cap module, wherein when the base module and cap module enclose an electro-magnetic component and the base module is connected to the cap module, one or more electric wires are compressed within deformable wire apertures formed by the combined base module and cap module. In some embodiments, the base module is deformable and deforms when affixed to the cap module so as to provide compressive a water-resistant seal to an interior of the capture device. In an exemplary embodiment, an LED may be captured within the capture device. The cap module may provide a compressing aperture to provide a water resistant seal around the lens of an LED projecting without the capture device.

In an exemplary embodiment, a water-resistant LED capture device may include a base module and a cap module. The cap module may be configured to assemble to the base module. In some embodiments, an internal cavity may be formed by the cap module and the base module when the cap module is assembled to the base module. The internal cavity may be configured to receive a light-emitting device therein. In some embodiments, the cap module may provide light transmissivity from a received light-emitting device to an outside of the water-resistant LED capture device.

Various embodiments may include a deformable sealing member that deforms as the cap module is assembled to the base module. In some embodiments, when the cap module is assembled to the base module and the deformable sealing member is deformed, the deformable sealing member may form a water resistant seal between the cap module and the base module along a substantially annular path.

In some embodiments, an assembly comprising the cap module and the base module may include two lumens. Each lumen may be configured to provide a pathway for an insulated conductor from the outside of the water-resistant LED capture device to the internal cavity to supply electrical energy to a light-emitting device therein.

Assembling the cap module to the base module may introduce a radial compression that reduces the mean cross-sectional area of each of the two lumens to form a water-resistant seal circumscribing each of the insulated conductors in the corresponding two lumens. In some embodiments, the lumens may have a reduced cross section at one or more locations along a longitudinal dimension of the lumen. In some embodiments, the mean cross-sectional area may be defined as the average cross-sectional area along a longitudinal dimension perpendicular to the cross-section. In some embodiments, the lumens may have a conical geometry, for example. In some embodiments, the lumens may have a substantially cylindrical geometry.

Various embodiments present various means for sealing a cap module to a base module. Some embodiment provide a water-resistant seal using an epoxy. In some embodiments, a compressible sealing member may compress between a cap module and a base module. In some embodiments a cap module may be deformable. A deformable cap module may expand when coupled to a base module. The expanded cap module may tightly engage the base module providing a water-resistant coupling. In some embodiments a raised annular ridge my couple to an annular depression of the complementary member, for example. In some embodiments a plurality of coupling features may present a series or water-resistive barriers.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A water-resistant lighting apparatus comprising:

a cap module having an open internal cavity;

a base module configured to assemble to the cap module, wherein the internal cavity is at least partially closed when the base module is inserted into the cap module, the internal cavity configured to at least partially receive a light-emitting device;

a sealant element disposed into the internal cavity in a liquid phase before assembling the base module into the cap module, and, the light emitting device coupled to insulated conductors;

wherein:

when the base module is assembled to the cap module:

the combination of the cap module and the base module defines two lumens extending longitudinally along at least the base module from one end of the cap module receiving the base module to the light emitting device at another end of the cap module, the two lumens configured to provide a pathway for the insulated conductors from an outside of the water-resistant lighting apparatus to the internal cavity to supply electrical energy to the light-emitting device therein, and the base module extends between electrical connections of the insulated conductors and, when the sealant element is at least partially in the liquid phase, at least a portion of the sealant element is distributed such that, when the sealant element subsequently transitions to a solid phase, the sealant element surrounds the electrical connections of the insulated conductors to the light emitting device.

2. The water-resistant lighting apparatus of claim 1, further comprising a light enclosure configured to receive the light emitting device therein, the cap module providing an optical path from the received light emitting device to an outside of the light enclosure.

3. The water-resistant lighting apparatus of claim 1, wherein the light emitting device is an LED module.

4. The water-resistant lighting apparatus of claim 1, where the cap module is comprised of more than one part.

5. A water-resistant lighting apparatus comprising:

a light enclosure comprising a base module protruded into and coupled to a cap module;

the cap module having an internal cavity;

the base module configured to assemble to the cap module, wherein the internal cavity is at least partially closed when the base module is assembled to the cap module, the internal cavity configured to at least partially receive a light-emitting device;

a sealant element disposed into the internal cavity in a liquid phase, and, the light enclosure configured to receive the light emitting device therein, the cap module providing an optical path from the received light emitting device to an outside of the light enclosure, wherein:

when the base module is coupled to the cap module, at least one two lumens extending longitudinally along at least the base module from one end of the cap module receiving the base module to the light emitting device at another end of the cap module, the at least one two lumens configured to provide a pathway for at least one of a plurality of insulated conductors from an outside of the water-resistant lighting apparatus to the internal cavity to supply electrical energy to the light-emitting device therein, when the sealant element is at least partially in a liquid phase, at least a portion of the sealant element is distributed between the base module and the cap module and between and around a plurality of connections of the plurality of insulated conductors with the light-emitting device such that, when the sealant element subsequently transitions to a solid phase, the sealant element separates the plurality of connections and forms a water-resistant seal between the base module and the cap module.

6. The water-resistant lighting apparatus of claim 5, wherein the sealant element is translucent.

7. The water-resistant lighting apparatus of claim 5, wherein the sealant element is transparent.

8. The water-resistant lighting apparatus of claim 5, wherein the sealant element comprises an epoxy.

9. The water-resistant lighting apparatus of claim 5, wherein the sealant element comprises a urethane.

10. The water-resistant lighting apparatus of claim 5, wherein the sealant element comprises a rubber cement.

11. The water-resistant lighting apparatus of claim 5, wherein the sealant element comprises an adhesive.

12. The water-resistant lighting apparatus of claim 5, wherein, after assembly to the cap module, the base module extends between the electrical connections of the plurality of insulated conductors.

13. The water-resistant lighting apparatus of claim 5, wherein the two lumens extending longitudinally through at least a portion of the base module, each of the two lumens being configured to provide a pathway for a separate insulated conductor from the outside of the water-resistant lighting apparatus to the internal cavity to supply electrical energy to the light-emitting device therein.

14. The water-resistant lighting apparatus of claim 1, wherein the sealant element is further distributed around the at least one lumen such that a water-resistant seal is formed at least between the at least one lumen and the base module.

15. The water-resistant lighting apparatus of claim 5, wherein the sealant element substantially entirely encompasses an electrical connection between each of the plurality of insulated conductors and the light-emitting device, including an entire exposed portion of a conductive element of the insulated conductor.

16. The water-resistant lighting apparatus of claim 5, wherein assembly of the base module to the cap module introduces radial compression such that at least part of the water-resistant seal between the base module and the cap module is provided by the radial compression.

17. The water-resistant lighting apparatus of claim 5, wherein the cap module has an aperture through which a lens of the light-emitting device projects when the light-emitting device is received in the internal cavity and the cap module is assembled to the base module.

18. The water-resistant lighting apparatus of claim 5, wherein the cap module comprises a lampholder and a lens, the lampholder being opaque, and the lens being at least partially optically translucent such that light emitted from the light-emitting device is visible external to the internal cavity through the lens.

19. The water-resistant lighting apparatus of claim 5, wherein an entirety of the cap module is translucent or transparent.

20. The water-resistant lighting apparatus of claim 5, wherein only a portion of the cap module is translucent or transparent.

21. The water-resistant lighting apparatus of claim 5, wherein the water-resistant seal is also formed between at least one of the plurality of conductors and at least one of the base module and the cap module.

22. The water-resistant lighting apparatus of claim 5, wherein the sealant element disposed within the internal cavity in a fluid form such that the water-resistant seal is formed surrounding at least a portion of the base module, the light emitting device, and the plurality of insulated conductors, wherein the sealant surrounds electrical connections of the plurality of insulated conductors to the light emitting device.

23. The water-resistant lighting apparatus of claim 5, wherein the light emitting device is an LED module.

24. The water-resistant lighting apparatus of claim 5, where the cap module is comprised of more than one part.

* * * * *